Nov. 15, 1955 — J. L. EDLUND — 2,723,828
FRICTION REDUCING CAP FOR A FAUCET BALL VALVE
Filed Dec. 7, 1951

Inventor
John L. Edlund
By W. S. J. Miller
ATTORNEY

United States Patent Office 2,723,828
Patented Nov. 15, 1955

2,723,828

FRICTION REDUCING CAP FOR A FAUCET BALL VALVE

John L. Edlund, Calgary, Alberta, Canada

Application December 7, 1951, Serial No. 260,543

1 Claim. (Cl. 251—88)

This invention relates to a friction-reducing cap for a faucet ball valve, the object of which is to prevent a binding association between the ball valve and its containing faucet stem, so that the ball valve is free to rotate about the coincident valve and faucet stem axes with a minimum of friction when the stem cup is pressed down thereon, the ball valve being of such a type that will rotate only about that axis coincident with the axis of the faucet stem with which it is associated, the internal end of the faucet stem being so cupped to enclose a semi-spherical portion of the ball valve, or a near semi-spherical portion thereof.

The free rotatability of this ball valve within the cup of the faucet stem, or reversely the cup relatively with the invented cap and ball valve combination, is of considerable importance, as is also the requirement that the ball valve will rotate only about stem and ball axis as above referred to.

A further object is that this cap is provided with a stem for its connection with the ball valve, either by inserting the stem into a prepared hole in the valve, or by pressing the cap stem into the valve when the stem is sharpened for this purpose. In either case it is readily fitted to the valve and removed therefrom as readily, and when so fitted it forms an integral part of the valve, although removable when necessary.

An advantage of this friction-reducing cap is that when operating the faucet it permits a near-frictionless smooth, quickly operable circular motion of the faucet stem relative therewith to prevent any possibility of sticking between the valve and the faucet stem, irrespective of the pressure applied.

With the type of ball valve mentioned, preferably of the grooved type rotatably retained within the faucet stem, this type of valve will seat itself downwardly and evenly on the faucet seat, and the valve will not turn in its seat due to the friction-reducing cap, which will reduce wear of the valve. However, the valve is free to rotate with the faucet stem as it leaves the seat, an important feature, as this presents a new contact face of the valve on the seat possibly at every turn of the faucet stem when being separated therefrom.

The use of the cap means that whatever friction may be present due to turning the faucet stem, it is not between the valve and its seat, but between the faucet stem cup and the said cap, thus saving wear on the valve and seat, and at the same time facilitating manipulation of the faucet, by reducing any likely friction between the valve and its seat and the faucet stem.

With the above mentioned objects and advantages in view this invention consists in the novel features hereinafter described and claimed, and in the drawings accompanying this specification it will be observed that similar numerals refer to similar parts throughout the different views.

Figure 1:
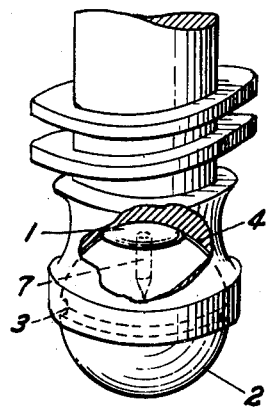
Fig. 1 is a view in perspective of the ball valve friction-reducing cap fitted to a ball valve, and the faucet stem in part, with stem cup having a portion broken away.
Figure 2:
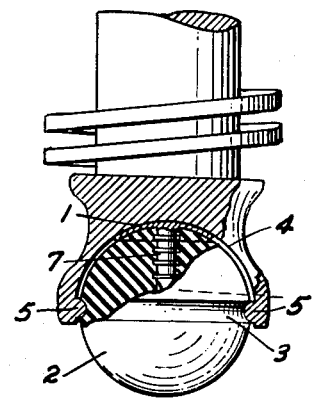
Fig. 2 is an elevational view of the friction-reducing cap on a ball valve, the valve and stem shown partly in section.

It is to be understood that this type of friction-reducing cap is adapted to such ball valves as illustrated in the accompanying drawings which have a circumferential groove at or about their major or near major diameters, when considering same in a plane perpendicular to the axis of the faucet stem of the faucet assembly, which groove constitutes a means of securing the ball valve element rotatively within the cupped bottom end of the faucet stem.

In the drawings the numeral 1 indicates a hollowed out type of friction-reducing cap for association with a ball valve 2. This ball valve is of the type which has a circumferential groove 3 around its maximum or near maximum circumference. The object of such groove is to allow the ball to rotate freely when engaged upon a continuous circular bead 5 formed upon the inside edge of the faucet stem cup 4. The cap 1 is secured to the ball valve by means of a spike 7 and fits on the ball between it and the inside face of the stem cup. A turn of the cup by the rotatable faucet stem presses the ball on its conventional seat with a minimum of friction resulting due to this interposition of the cap. On release of this pressure the ball has a tendency to rotate due to slight friction existing between it and the stem cup as the stem is raised. This slight movement provides a new contact position between the ball and its seat.

Figure 3:
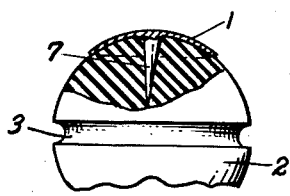
Fig. 3 is a cross sectional view of the friction reducing cap so hollowed as to fit the contour of the ball valve, and having a pointed stem, and showing the ball valve partly in section.
Figure 4:
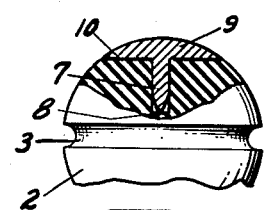
Fig. 4 is a cross sectional view of the solid friction reducing cap of segmental cross section with its stem, as used with a flattened top ball valve, and showing the ball valve partly in section.
Figure 5:
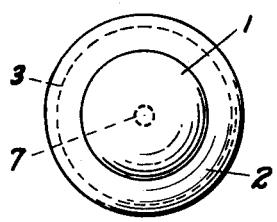
Fig. 5 is a plan view of Fig. 3.
Figure 6:
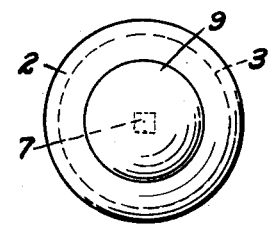
Fig. 6 is a plan view of Fig. 4.

In Figs. 4 and 6 the stem 7 is indicated as of square section but having a pointed end and is inserted in the opening 8 formed in the ball valve, all of which serve the purpose of maintaining the ball and cap combination relatively together, being thus easily connected and readily separated when necessary. These stem shapes are varied merely to indicate possible ways of so retaining the cap and its stem on the ball valve. A slight sidewise action is necessary when removing a cap from the ball valve with the possible exception of the stem type shown in Fig. 3.

A solid arcuate shape cap 9 having a flat under face is shown in Figs. 4 and 6, and to accommodate such a cap, a flat surface 10 would have to be provided on the ball valve. Such a cap is a solid segment in cross section, and may be provided with a round, square or sharp pointed stem.

What I claim and desire to secure by Letters Patent is:

In a valve for faucets and the like, a valve stem having a semi-spherical recess in the lower end thereof, a deformable ball valve complemental to said recess for approximately one-half of the circumference of said ball valve, means for securing said ball valve within said semi-spherical recess comprising an annular groove in the largest diameter portion of said ball valve, and a continuous circular bead extending from said valve stem and seated in said groove, whereby said ball valve will rotate only in a plane at right angles to said valve stem, and said ball valve having a curved anti-friction cap for free contacting engagement with said semi-spherical recess, said cap being arranged only on top of said ball valve, and a prong depending from said cap and extending into said ball valve, the inner end of said prong being pointed and being spaced above a plane extending through said groove, the outer surface of said cap being smooth and said cap being free of openings, said cap being dome shaped, the enlarged outer portion of said prong being secured to the inner surface of said cap.

References Cited in the file of this patent

UNITED STATES PATENTS

| | | |
|---|---|---|
| 260,030 | Johnson | June 27, 1882 |
| 630,011 | Smith | Aug. 1, 1899 |
| 1,409,127 | Wasem | Mar. 7, 1922 |
| 2,300,111 | Edlund | Oct. 27, 1942 |

FOREIGN PATENTS

| | | |
|---|---|---|
| 122,987 | Great Britain | 1919 |